Patented June 16, 1925.

1,542,684

UNITED STATES PATENT OFFICE.

EDGAR EVERHART, OF ATLANTA, GEORGIA.

PROCESS FOR OBTAINING MAGNESIA FROM DOLOMITE.

No Drawing.　　　Application filed December 29, 1924.　Serial No. 758,744.

*To all whom it may concern:*

Be it known that I, EDGAR EVERHART, a citizen of the United States, residing at Atlanta, in the county of Fulton and State of Georgia, have invented certain new and useful Improvements in Processes for Obtaining Magnesia from Dolomite; and I do hereby declare the following to be a full, clear, and exact description of the invention, such as will enable others skilled in the art to which it appertains to make and use the same.

The present invention relates to improvements in process for obtaining magnesia from dolomite, and has for an object to provide for the recovery of the oxide from this stone or mineral by few and simple steps adapted to be carried out in existing forms of apparatus.

Dolomite is a crystallized mineral containing carbonate of calcium and magnesium and considerable difficulty has been experienced in reducing the crystalline stone commercially; and great expense has been heretofore involved in the reduction and particularly in the separation of the magnesium and its conversion into the oxide.

It is the purpose of the invention to achieve this result directly and economically and to secure in a commercially practicable way other by-products.

The invention will be more fully described hereinafter but it is to be understood that the sequence of steps hereinafter set forth may be varied as desired and to suit particular conditions. The method may be varied within the skill of the chemist without departing from the spirit of the invention.

The dolomite is first thoroughly calcined to remove the carbon dioxide from the stone. The calcined stone is then slacked and mixed with sufficient water to give a fluid mass. Into this fluid mass, with constant agitation is run dilute acetic acid in quantity sufficient to neutralize the lime present. A slight excess is not prejudicial.

The acetic acid first acts on the lime and leaves the magnesia entirely unacted on.

The calcium acetate formed goes into solution and may be removed by filtration and washing or by other suitable means.

The residual mass consists of magnesium hydroxide and oxide together with the silica, iron, etc., that were in the original dolomite.

The solution of calcium acetate drawn off from the magnesia can be easily converted into acetone or may be used for any other purpose for which it is adapted.

In case it is desired to obtain a pure magnesia this may easily be accomplished by treating the magnesia mass separated from the lime with carbonic acid which will dissolve only the magnesia.

From the foregoing it will be appreciated that the reduction of the stone and the separation of its components is achieved readily and with few and economic steps which can be carried out in existing forms of apparatus while securing in a commercially practicable way the valuable and much demanded magnesia.

I wish it to be understood that the steps of the process may be varied and chemical equivalents used wherever the quality or character of the stone dictate without in any way changing the nature and scope of the invention.

I reserve the right to make all such changes as fall within the scope of the following claims:—

What is claimed is:—

1. That process for obtaining magnesia from dolomite which consists in calcining the dolomite to remove carbon dioxide, slacking the calcined stone and mixing the same with sufficient water to yield a fluid mass, agitating the fluid mass, while introducing dilute acetic acid in sufficient quantity to neutralize the lime without affecting the magnesia, and removing the calcium acetate leaving the magnesium hydroxide.

2. That method for obtaining magnesia from dolomite which consists in first reducing the dolomite to drive off the carbon dioxide, slacking the reduced dolomite, introducing acetic acid to neutralize the lime, separating out the calcium acetate and treating the residual magnesia mass separated from the lime with carbonic acid whereby to dissolve only the magnesia.

EDGAR EVERHART.